(12) United States Patent
Liu

(10) Patent No.: US 7,733,541 B2
(45) Date of Patent: *Jun. 8, 2010

(54) METHOD OF SHORTENING MULTIPLE-IMAGE SCANNING DURATION

(76) Inventor: Rong-Ji Liu, No. 3, Lane 442, Wen-Hsin Rd., Sec. 1, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/780,880

(22) Filed: Jul. 20, 2007

(65) Prior Publication Data

US 2007/0258115 A1 Nov. 8, 2007

Related U.S. Application Data

(63) Continuation of application No. 09/924,883, filed on Aug. 8, 2001, now Pat. No. 7,265,878.

(51) Int. Cl.
*H04N 1/04* (2006.01)
(52) U.S. Cl. .............. 358/474; 358/1.9; 358/486; 358/2.1; 382/317; 382/164; 382/180
(58) Field of Classification Search .......... 358/474, 358/486, 497, 496, 1.9, 1.2; 382/309, 173, 382/319, 164, 165, 176, 180, 299, 273
See application file for complete search history.

(56) References Cited

U.S. PATENT DOCUMENTS

| | | | | | |
|---|---|---|---|---|---|
| 5,119,207 | A | * | 6/1992 | Niitsuma et al. | 358/296 |
| 5,475,509 | A | * | 12/1995 | Okamoto | 358/518 |
| 5,956,468 | A | * | 9/1999 | Ancin | 358/1.9 |
| 5,959,675 | A | * | 9/1999 | Mita et al. | 375/240.04 |
| 6,009,196 | A | * | 12/1999 | Mahoney | 382/176 |
| 6,304,683 | B1 | * | 10/2001 | Kiyohara et al. | 382/317 |
| 6,757,081 | B1 | * | 6/2004 | Fan et al. | 358/474 |
| 7,265,878 | B2 | * | 9/2007 | Liu | 358/474 |
| 7,593,553 | B2 | * | 9/2009 | Fujii | 382/124 |
| 2003/0123756 | A1 | * | 7/2003 | Yamamoto | 382/309 |
| 2003/0128487 | A1 | * | 7/2003 | Tsai | 361/91.1 |

* cited by examiner

*Primary Examiner*—Negussie Worku
(74) *Attorney, Agent, or Firm*—Stolowitz Ford Cowger LLP

(57) ABSTRACT

A method of shortening multiple image-scanning duration including setting the scanning parameters of each images in a pre-scanning operation, categorizing the images into groups, assigning images belonging to the same group to a scanning region and finally initializing the scanning operation.

25 Claims, 4 Drawing Sheets

METHOD OF SHORTENING MULTIPLE-IMAGE SCANNING DURATION

BACKGROUND OF THE INVENTION

1. Field of Invention

The present invention relates to a method of scanning multiple images. More particularly, the present invention relates to a method for shortening multiple-image scanning duration.

2. Description of Related Art

In general, a scanner has a scanning head over a scanning surface. The scanning head is driven by a stepping motor to scan a document. FIG. 1 is a schematic diagram showing the positions of a scanning head 102 driven by a stepper into performing a multiple image scanning operation. As shown in FIG. 1, a multiple of scanning documents A to G is placed over a scanning platform. To carry out an image scanning, the scanning head 102 is driven from an initial position down to the edge line 'a' of image A. Image A is scanned until the edge line c of image A is reached. However, during scanning, the scanning head 102 reaches the edge line b of image B first. Consequently, after complete scanning of image A, the scanning head 102 is driven by the stepper back to edge line b before image B can be scanned. By repeating the aforementioned scanning steps, all images on the scanning platform are scanned. The pointed arrows on the left hand side of FIG. 1 indicate the direction of movement of the scanning head 102 driven by the stepper. In other words, the arrows show the stepping movement of the scanning head 102 for a complete scanning of images A~G.

In a multiple image scanning operation, if a scanning line section is within two or more images, backtracking of the scanning head is required. For example, image A and image B contains a common scanning line section and the scanning head needs to backtrack after scanning image A before scanning image B. Similarly, image B and image C have a common scanning line section and the scanning head needs to backtrack after scanning image B before scanning image C.

During normal scanning, the stepper motor must shuttle back and forth to bring the scanning head 102 into position. Hence, a lot of time is wasted in the conventional method to move the scanning head over overlapping scanning line sections.

SUMMARY OF THE INVENTION

Accordingly, one object of the present invention is to provide a method for shortening multiple-image scanning duration and reducing non-performing movement of scanning head.

To achieve these and other advantages and in accordance with the purpose of the invention, as embodied and broadly described herein, the invention provides a method of shortening multiple-image scanning duration. The method includes the following steps. In a pre-scanning stage, scanning parameters for each scan image are set. A most suitable categorization method is used to classify the images. Similar types of scan images are grouped together under the same scanning region. Finally, scanning is initialized.

The categorization method includes the following criteria. Images that contain a common scanning line section are put in a first category. Images that are within a preset number of scanning stops are put in a second category. Images that are within a resolution range are put in a third category. In addition, images that fit user-defined parameters are put in a fourth category. Images may be classified using just one type or more than one type of image categorization. The purpose of dividing images into different categories is to complete image scanning in the shortest scanning path.

In brief, this invention utilizes a pre-scanning operation to classify a set of images into different categories before actually conducting a scanning operation. Since the scanning head driven by the stepper motor is able to traverse the shortest possible path to complete the scanning, overlapping forward backward movement is minimized. In some cases, scanning can be completed in a single forward or backward movement instead of a forward and backward movement, further reducing scanning time for scanning multiple images.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
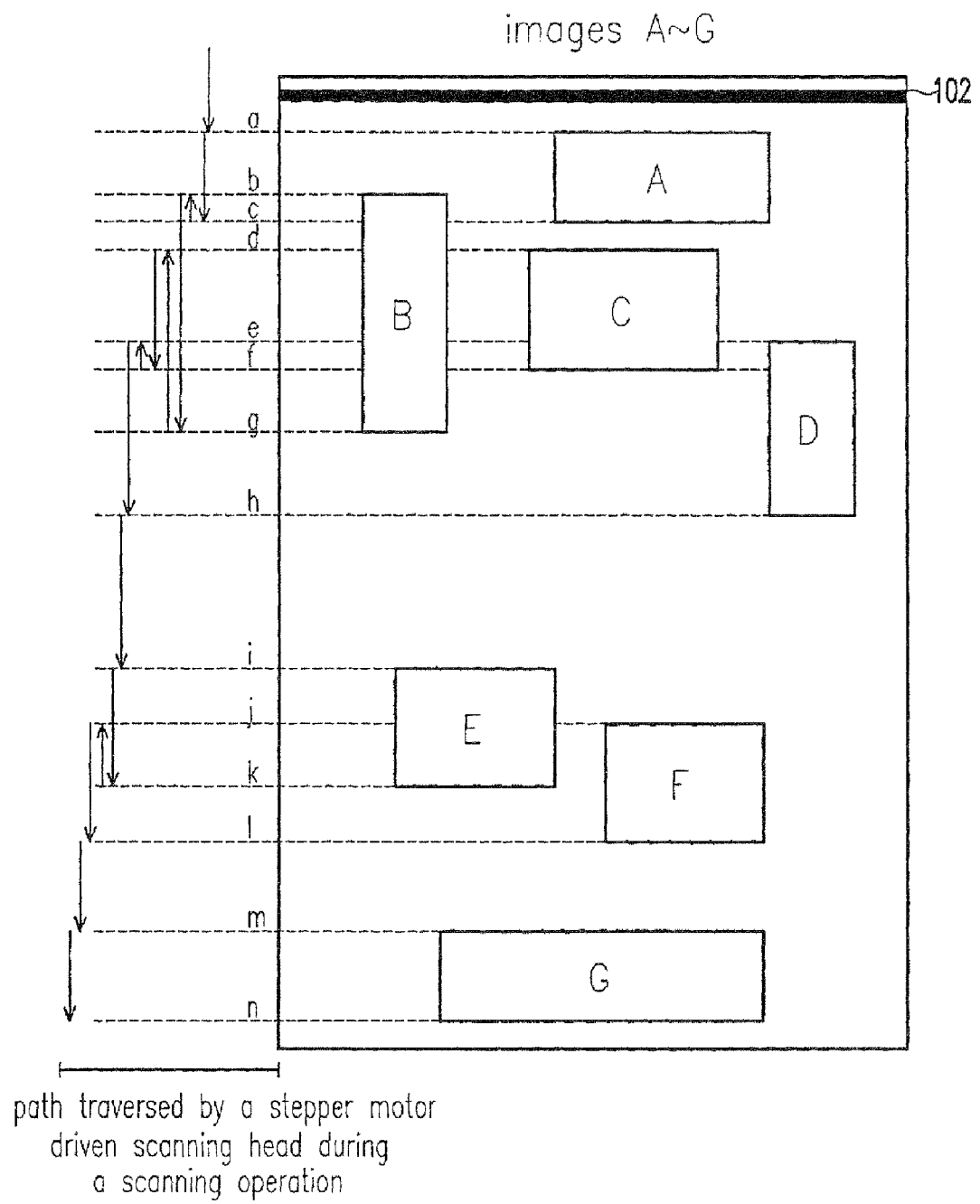
FIG. 1 is a schematic diagram showing the positions of a scanning head 102 driven by a stepper into performing a multiple image scanning operation.

Reference will now be made in detail to the present preferred embodiments of the invention, examples of which are illustrated in the accompanying drawings. Wherever possible, the same reference numbers are used in the drawings and the description to refer to the same or like parts.

Figure 2:
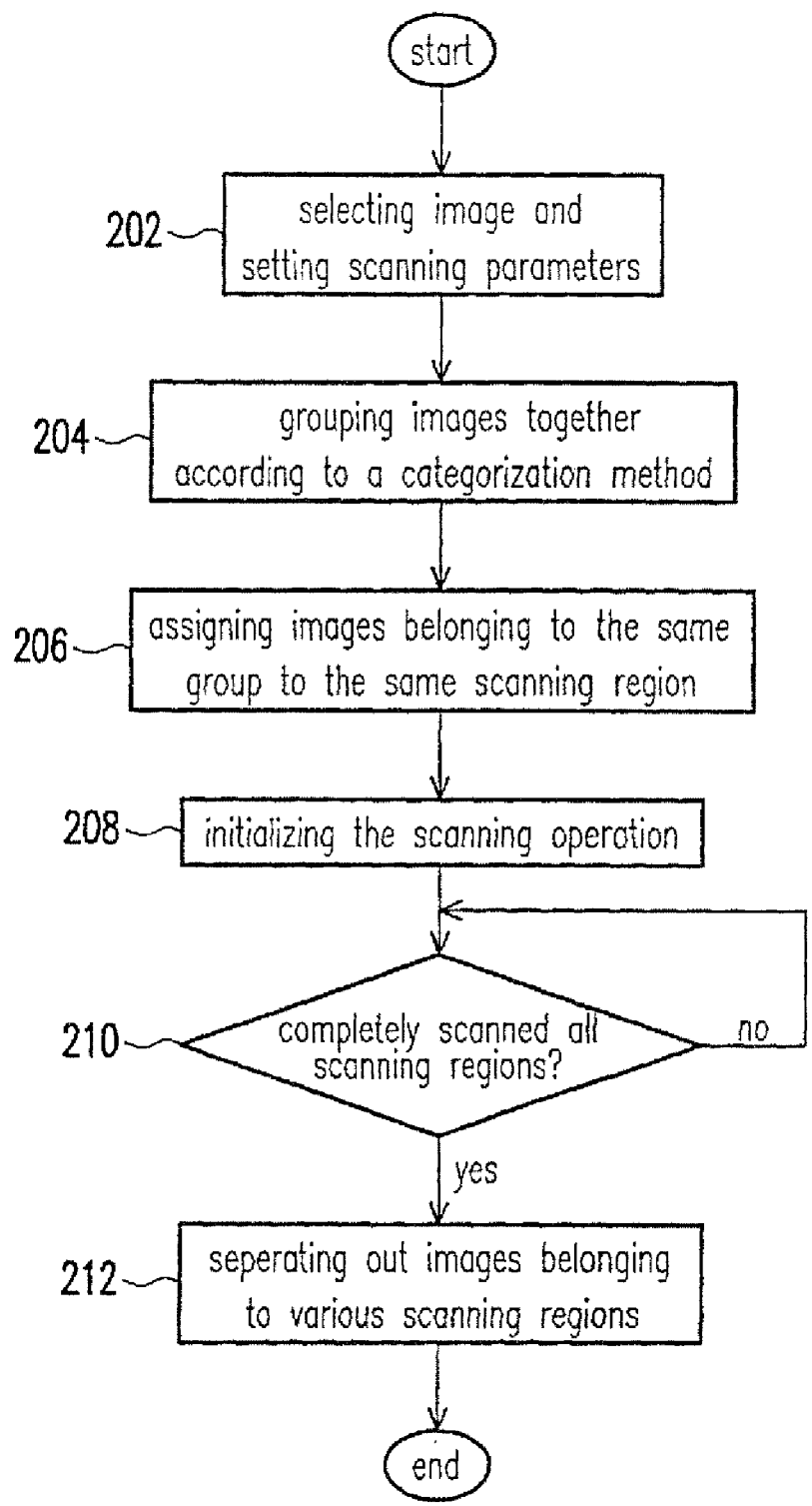
FIG. 2 is a flow-chart showing the steps for scanning multiple images according to this invention.

FIG. 2 is a flow chart showing the steps for scanning multiple images according to this invention. The method according to this invention includes the following steps. First, a pre-scanning operation is conducted to pick up those images that require scanning and set the scanning parameters of those images (in step 202). The scanning parameters include image resolution and quantity of image data. The images are categorized (in step 204) and images in the same category are set inside the same scanning region (in step 206). A stepper motor drives a scanning head to initiate a scanning operation (in step 208). The scanning operation is checked to determine if all scanning regions are already scanned (in step 210). If all scanning regions are scanned, images within a scanning region are separated out (in step 212) before the end of the scanning operation.

Figure 3:
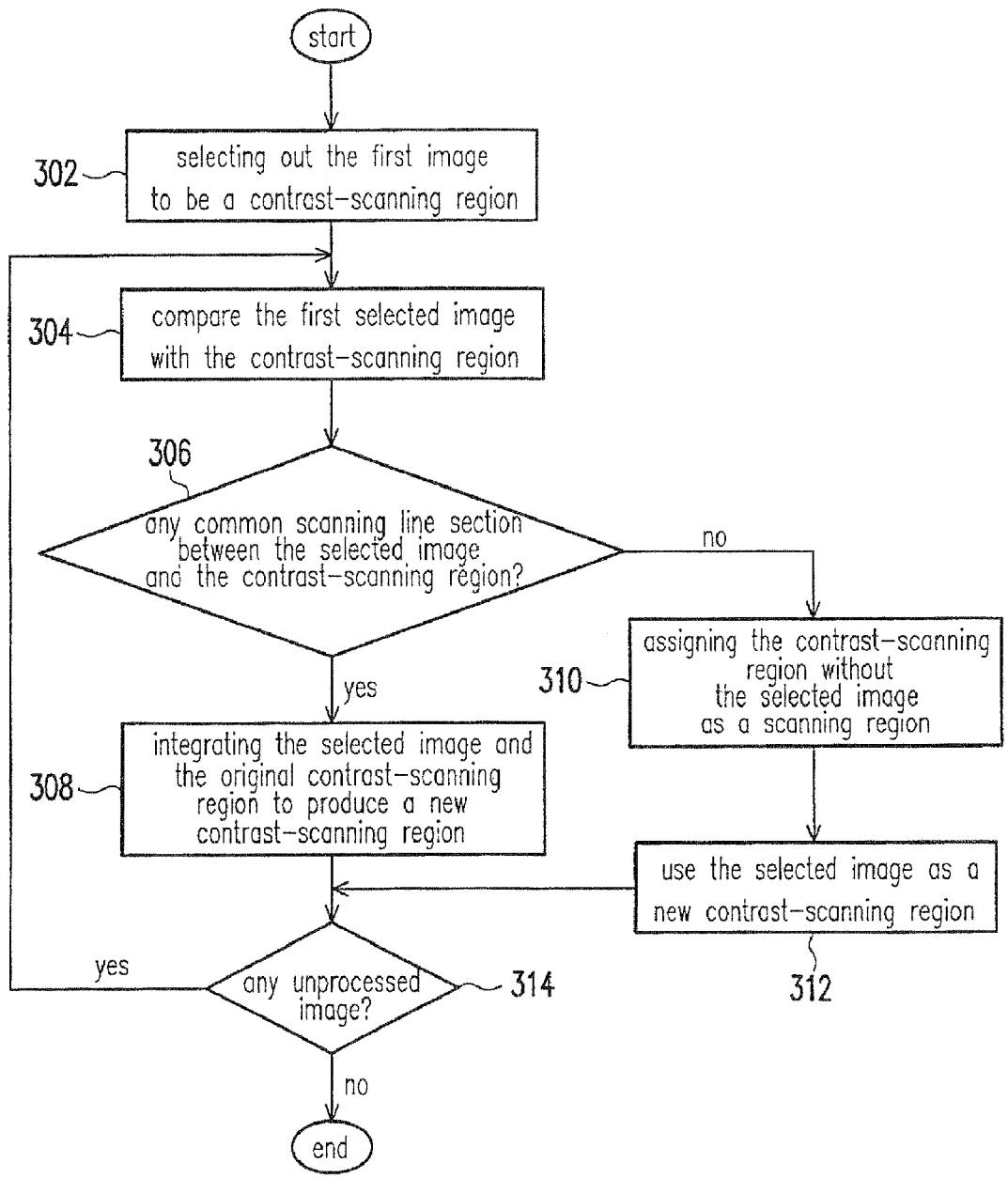
FIG. 3 is a flow-chart showing the steps for categorizing images and setting up scanning regions according to this invention.

FIG. 3 is a flow chart showing the steps for categorizing images (in step 204) and setting up scanning regions (in step 206) according to this invention. First, a first image is selected to be a contrast-scanning region (in step 302). A comparison between another selected image and the contrast-scanning region (in step 304) is conducted. The image is inspected to determine if there is any common scan line section with the contrast-scanning region (in step 306). If there is such a common scan line section, the two are integrated together to form a new contrast-scanning region and continue to inspect whether there are any more images not yet selected (in step 308). On the other hand, if there is no common scan line section, the contrast-scanning region excluding the selected image is set as a scanning region (in step 310) and the selected image is chosen as a new contrast-scanning region (in step 312). The aforementioned process is repeated if some images are still pending selection (in step 314). In other words, if some images remain to be selected, control is returned to image selection and comparison with the contrast-scanning region step (step 304). If all images have been selected, image categorization and scanning region setting is complete.

The following is an example of the steps 204 and 206 in FIG. 2 for putting images into different regions. In the example, assume images are categorized according to whether the image contains a common scanning line section. Two or more images have a common scanning line section if a scanning line passes through all those images.

Figure 4:
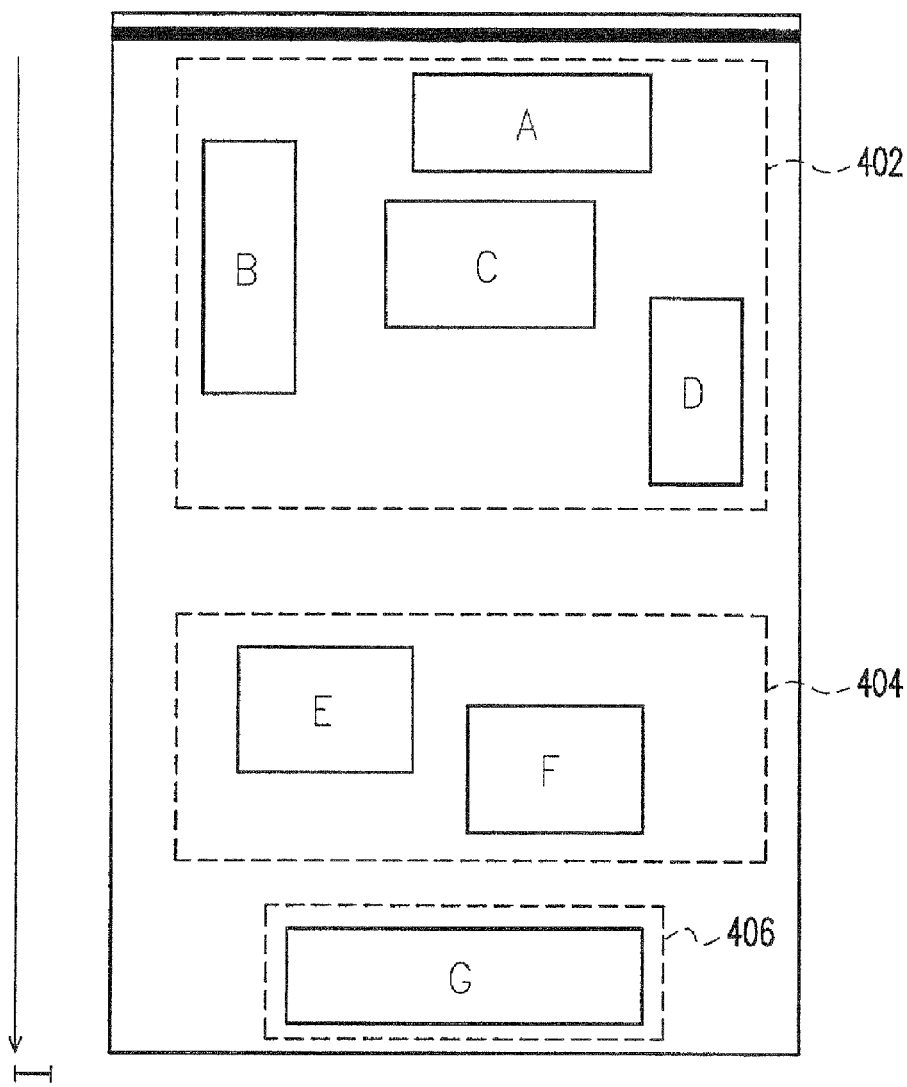
FIG. 4 is a schematic diagram showing the resultant form after image categorization and image grouping according to this invention.

FIG. 4 is a schematic diagram showing the resultant form after image categorization and image grouping according to this invention. As shown in FIG. 4, images A, B, C, D, E, F and G need to be categorized according to whether they have any common scanning line section. A first image such as A is selected to be a contrast-scanning region (in step 302). A second image B is selected to compare with the contrast-scanning region (image A) (in step 304). The selected image B and the contrast-scanning region have a common scanning line section (in step 306). Image A and image B are integrated together to form a new contrast-scanning region (in step 308). Since there are some images remain to be selected such as image C (in step 314), control returns to step 304 again. Image C is compared with the new contrast-scanning region (integration of image A and B) to check if there is any common scanning line section (in step 306). If there is, image C is combined with the old contrast-scanning region to produce a new contrast-scanning region (in step 308). The above procedure is repeated. It is not difficult to see that image pairs A-B, B-C, C-D, B-D all contains common scanning-line sections. Hence, in step 310, images A, B, C and D can be grouped together to form a scanning region 402.

Before images A, B, C and D are combined together into a scanning region 402, step 306 needs to be executed. In step 306, it is determined that image E has no common scan line section with any one of the images A, B, C and D. Hence, in step 310, the contrast-scanning region that excludes image B becomes the scanning region 402. In step 312, image E is chosen to be the new contrast-scanning region.

Steps 304 to 314 are repeated until all images are categorized. By a similar procedure, images E and F are set inside the same scanning region 404 while image G is independently set inside the scanning region 406.

In step 306, this invention also provides procedures for categorizing the degree of resolution of the images. If the resolution of a number of images falls within a definite range, these images may be grouped together inside a scanning region.

Furthermore, in step 306, this invention also provides procedures for categorizing the number of scanning stops after image integration into groups each having a preset range. In other words, if the number of scanning stops after image integration falls within a defined range, the integrated images are grouped together inside a scanning region.

When the stepper motor drives the scanning head to perform a scanning operation, data are transferred to an image buffer. After the data buffer is completely filled, the stepper motor will stop until all data within the buffer are transferred elsewhere. This process is repeated until all scanning regions are scanned and data transferred. The number of scanning stops refers to the number of times the stepper motor needs to be stopped.

Utilizing a preset stop-scanning number as a means of categorization refers to estimating whether the number of scanning stops of the images forming the contrast-scanning region is within the preset stop-scanning range in the pre-scanning operation. If the number is within range, the images of the contrast-scanning region are set inside the same scanning region and vice versa.

In addition, in step 306, this invention also permits a user to set up user-defined parameters to categorize the images. Images having the same user-defined parameters are grouped together inside a scanning region. In other words, images can be arbitrarily categorized and the scanning region for a particular set of images can be arbitrarily assigned.

In summary, images are categorized according to whether the images have a common scanning line section, whether the images fall within a resolution range, whether the number of scanning stops during an image scanning operation is within a preset number or whether the image belongs to a set of user-defined parameters. Besides using any one of the aforementioned categorization methods, images may be categorized according to any combination of the methods. For example, resolution and the number of scanning stops can be used as criteria for categorizing the images in step 306.

After proper categorization of images and assignment of scanning regions, the stepper motor is able to drive the scanning head along an optimal or shortest path during a scanning operation with few overlapping forward/backward movements. In some cases, scanning can be completed in a single forward or backward movement instead of a forward and backward movement, further reducing scanning time for scanning multiple images. In short, this invention is able to reduce scanning path length and scanning time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus, comprising:
   means for setting scanning properties of images to be scanned in a pre-scanning operation;
   means for comparing the images including comparing at least a portion of one of the images with at least a portion of another one of the images to determine whether the images share a common scan line and, if so, classify the images into a same group;
   means for assigning ones of the images that belong to the same group to a scanning region; and
   means for initializing a scanning operation corresponding to the scanning region.

2. The apparatus of claim 1, further comprising:
   means for driving movement of a scanner head during the scanning operation;
   wherein during scanning of the scanning region the scanner head moves through the scanning region without backtracking over the common scan line.

3. The apparatus of claim 1, further comprising:
   means for identifying a portion of the images that all share the common scan line; and
   means for identifying a subsequent portion of the images, the subsequent portion including the images from the previous portion and remaining ones of the images that share a common scan line with at least one of the images from the previous portion.

4. The apparatus of claim 3, further comprising means for repeating identification of further subsequent portions until all subsequent portions are identified, and wherein the group includes all the identified portions.

5. The apparatus of claim 1, further comprising:
means for comparing resolutions of the images; and
means for classifying the images according to both the resolution comparison and the common scan line determination.

6. The apparatus of claim 1, further comprising:
means for determining a number of stops required to scan all the images classified into the same group; and
means for assigning all the images classified into the same group into the same scanning region if the determined number is within a defined range.

7. The apparatus of claim 1, further comprising:
means for comparing user-defined parameters of the images; and
means for classifying the images according to both the user-defined parameter comparison and the common scan line determination.

8. A method, comprising:
comparing scan lines of images to be scanned to identify common scan lines;
grouping the images according to the comparison so that any group formed includes at least two images sharing a common scan line with each other;
integrating ones of the images that belong to the same group into a scanning region; and
using a scanning device, illuminating the scanning region and converting light reflected from the scanning region into electrical signals representing the images of the scanning region.

9. The method of claim 8, further comprising integrating the images based at least in part on user-defined parameters.

10. The method of claim 8, further comprising integrating the images based at least in part on image resolution.

11. The method of claim 8, further comprising integrating all the images from the group into the scanning region if the number of scanning stops required to scan all the images in the group is within a defined range.

12. The method of claim 8, further comprising:
identifying a portion of the images that all share a common scan line; and
identifying a subsequent portion of the images, the subsequent portion including the images from the previous portion and remaining ones of the images that share a common scan line with at least one of the images from the previous portion.

13. The method of claim 12, further comprising repeating identification of subsequent portions until all subsequent portions are identified, and wherein the group includes all the portions.

14. The method of claim 12, wherein the group includes a portion of the images that all share the common scan line with each other and at least one other portion of the images, the other portion including at least one image that shares a common scan line with at least one image from the portion.

15. The method of claim 8, wherein the scanning region is scanned with a single forward or backward movement without both forward and backward movements.

16. An apparatus, comprising:
a processing component configured to identify a plurality of images to be scanned;
the processing component configured to group the images according to scanning line so that any group formed contains at least two images sharing a common scanning line; and
the processing component configured to form a scanning region using images from the group;
wherein the apparatus is configured to scan the formed scanning region.

17. The apparatus of claim 16, further comprising:
a driving component in communication with the processing component, the driving component configured to control movement of a scanner head during the scanning;
wherein the scanning region and all the images included therein are scanned without requiring backtracking of the scanner head.

18. The apparatus of claim 16, wherein the identification, grouping, and forming of the scanning region allow a scanner head to scan the images included in the scanning region without crossing the common scanning line more than once.

19. The apparatus of claim 16, further comprising the processing component configured to set scanning parameters for the images.

20. The apparatus of claim 16, further comprising:
the processing component configured to compare resolutions of the images in the group; and
the processing component configured to form the scanning region based at least in part on the comparison.

21. The apparatus of claim 16, further comprising:
the processing component configured to determine the number of stops required to scan all the images classified into the group; and
the processing component configured to form the scanning region using all the images in the group if the determined number is within a defined range.

22. The apparatus of claim 16, further comprising:
the processing component configured to compare user-defined parameters of the images in the group; and
the processing component configured to form the scanning region based at least in part on the comparison.

23. The method of claim 8, further comprising:
identifying a portion of the images that all share a common scan line; and
identifying a subsequent portion of the images, the subsequent portion including the images from the previous portion and remaining ones of the images that share the common scan line with at least one of the images from the previous portion.

24. The method of claim 23, further comprising repeating identification of further subsequent portions until all subsequent portions are identified, and wherein the group includes all the portions.

25. The method of claim 23, wherein the group includes a portion of the images that all share the common scan line with each other and at least one other portion of the images, the other portion including at least one image that shares a common scan line with at least one image from the portion.

* * * * *